United States Patent

Touey et al.

[15] 3,640,742
[45] Feb. 8, 1972

[54] PLASTICIZER BLEND FOR CELLULOSE ESTERS

[72] Inventors: George P. Touey; Cephas H. Sloan, both of Kingsport, Tenn.

[73] Assignee: Eastman Kodak Company, Rochester, N.Y.

[22] Filed: July 3, 1967

[21] Appl. No.: 650,658

[52] U.S. Cl. ............................106/179, 106/180, 131/267
[51] Int. Cl. .........................................C08h 17/42
[58] Field of Search ....................106/179, 180; 131/267

[56] References Cited

UNITED STATES PATENTS 2,794,239   6/1957   Crawford et al. .................206/59

OTHER PUBLICATIONS

D.N. Buttrey, *Plasticizers*, Cleaner-Hume Press Ltd., London, 1947, Pages 45 and 51.

Primary Examiner—Morris Liebman
Assistant Examiner—S. M. Person
Attorney—William T. French and Daniel B. Reece, III

[57] ABSTRACT

A cellulose ester plasticizer blend made from about 40 to 60 percent by weight of glyceryl triacetate with the remainder being primarily a poly(ethylene glycol) diacetate.

6 Claims, No Drawings

PLASTICIZER BLEND FOR CELLULOSE ESTERS

This invention relates to an improved cellulose ester plasticizer type hardening agent which cures the ester very rapidly and has improved hydrolytic stability. More particularly, this invention relates to the use of a blend of glyceryl triacetate (triacetin) and a poly(ethylene glycol) diacetate as an improved hardening plasticizer for a cellulose ester such as cellulose acetate.

One heretofore accepted technique of preparing a rigid fibrous nonwoven or batting-type product from continuous cellulose acetate-type filaments, which is commercially known as a nonwoven batting or tow, involves adding from 5 to 15 percent by weight of glyceryl triacetate to the opened or spread out batting. The treated tow is then compacted or otherwise formed into the shape of the desired final product. The glyceryl triacetate plasticizer on the batting functions as a slow solubilizing agent for the filaments, which may be continuous or staple, thereby slowly dissolving a portion of the fibers with which it comes in contact. This causes a fusing action of the fibers at random points of contact throughout the fibrous matrix thus giving the matrix the rigid structure so necessary for subsequent processing. Obviously, the amount of plasticizer added to the batting must be controlled within certain limits since too small an amount would not give sufficient rigidity to the finished fibrous matrix while too large an amount would fuse too many filaments together thereby producing a structure which is too rigid for many uses.

The action by which the cellulose acetate batting is fused together by the glyceryl triacetate plasticizer is very important since it is accomplished without the application of heat. As is well known, this gradual hardening of the plasticizer treated batting takes place at room temperature thus eliminating the need for heating either the plasticizer or the batting during the plasticizer addition, or heating the final fibrous matrix. Other types of conventional cellulose ester plasticizers do not possess this asset but are either nonhardening agents for the cellulose acetate, nonwoven material regardless of the curing steps taken, or are so sluggish in their hardening action that heat is required at some point in the fabrication or the matrix for accelerating the bonding reaction.

Another unique advantage of glyceryl triacetate as a hardening agent for cellulose acetate battings is its nontacky nature. As mentioned hereinabove, glyceryl triacetate is an oily substance which gradually hardens the batting at room temperature after it is fabricated. This is in marked contrast to the use of so called "adhesive" types of hardening agents which make the batting tacky as soon as they are applied. The use of such adhesive hardening agents in the manufacture of certain fibrous matrix-type articles is very objectionable since they cause the staple or continuous batting material to adhere to the fabricating equipment through which it must pass after the application of the hardening agent. Also, the use of adhesives usually implies the need for removal of either water or an organic solvent which adds both to the equipment necessary and the expense involved in producing the final product.

Even though glyceryl triacetate is one of the most efficient of the plasticizers which is available for hardening cellulose acetate nonwoven materials, and is vastly superior to adhesives, glues, or other solvent based resins as a hardening agent, it still leaves much to be desired. For example, the freshly prepared glyceryl triacetate containing fibrous matrix must be stored for about 2 hours at room temperature (about 25° C.) before it becomes sufficiently rigid to be cut into smaller segments. This slow curing time often causes the treated fibrous matrix to become deformed or otherwise distorted in shape before it hardens. This is especially true where the fibrous matrix is subject to a loading, as occurs if they are stacked on top of each other before they have had time to cure.

To alleviate some of these limitations of glyceryl triacetate a more recent group of plasticizers has been introduced to the industry. These new plasticizers consist of the acetic acid esters of diethylene glycol, triethylene glycol, tetraethylene glycol and such poly(ethylene glycols) which have a molecular weight to about 700–1000. These new acetic acid esters are superior to those prior known plasticizer bonding agents in that they harden the plasticizable fibrous matrix at room temperature in a shorter length of time (about 30 minutes as opposed to 2 hours for glyceryl triacetate).

However, although the acetic acid ester plasticizers have a faster bonding action than glyceryl triacetate, they have certain limiting characteristics which are not common to glyceryl triacetate. One problem is that they are more hygroscopic than glyceryl triacetate. That is, they absorb moisture more readily and therefore become contaminated with water if they are exposed to moist air. This makes storage of the material in air vented tanks on humid days somewhat of a problem. Also, the presence of water in the water-miscible ester makes it more susceptible to hydrolysis, and hydrolysis leads to the formation of trace amounts of acetic acid which is quite objectionable if the fibrous matrix is to come into close contact with an individual.

Thus, it can be seen that the development of a new and improved bonding or hardening agent for cellulose acetate tow would represent a substantial step forward in the fibrous matrix or batting field. As will be appreciated, any new bonding or hardening agent must have no unpleasant odors as is characteristic of plasticizers that hydrolyze. The plasticizers for use on nonwoven staple of fibrous materials must also be nontacky and, ideally, less expensive to produce and use than bonding agents now available. Furthermore, these new bonding agents should be capable of hardening the fibrous matrix at room temperature in a shorter period of time than was heretofore required.

According to the present invention it has been found that a new and superior group or blend of bonding or hardening agents for continuous or staple cellulose ester fibers can be produced which are nontacky and will harden the cellulose fibers in a shorter period of time than heretofore thought possible. Furthermore, these new blends of bonding or hardening agents are less expensive to produce and will harden a cellulose ester fiber at room temperature.

According to one embodiment of this invention, the rapid bonding plasticizer formulation comprises from about 40 to 60 percent by weight of glyceryl triacetate blended with from about 60 to 40 percent by weight of a poly(ethylene glycol) diacetate. Normally the poly(ethylene glycol) diacetate is selected from the group consisting of di-, tri-, tetra-, penta-, and heptaethylene glycol diacetate. It was quite unexpectedly discovered that by carefully controlling the percent of polyethylene glycol) diacetate blended with glyceryl triacetate a bonding or hardening agent could be produced which would harden a cellulose ester type batting at room temperature in a shorter period of time than could be obtained by using either the glyceryl triacetate or poly(ethylene glycol) diacetate alone.

Therefore, an object of this invention is to disclose a new plasticizer blend which is capable of hardening a cellulose ester batting in an extremely short period of time.

Another object of this invention is to disclose a more rapid bonding plasticizer for batting prepared from staple or continuous cellulose ester filaments.

A further object of this invention is to disclose a more rapid plasticizer bonding agent that has a less tendency to hydrolyze when exposed to a humid atmosphere than that exhibited by the acetic acid esters of the poly(ethylene glycol) diacetates heretofore used by the fibrous matrix industry.

These and other objects and advantages of this invention will be more apparent upon reference to the accompanying specification, specific working examples, and appended claims.

As briefly set out hereinabove, this invention involves the blending together of selected amounts of glyceryl triacetate (triacetin) and poly(ethylene glycol) diacetate to produce a bonding agent for cellulose acetate which is less expensive, will react faster to harden the materials, and is readily adaptable for use in the fibrous matrix field. The percentage of glyceryl triacetate blended with the poly(ethylene glycol) diacetate wherein is quite critical and has been found to extend within the range of from 40 to 60 percent by weight glyceryl triacetate and from 60 to 40 percent of a poly(ethylene glycol) diacetate, which can be represented by the following formula:

wherein $$RO(CH_2CH_2O)_n-R$$

$$R = CH_3C{\overset{O}{\diagup}}$$

and $n=2$ to 6. That is, the poly(ethylene glycol) diacetate is chosen from the group consisting of diethylene glycol diacetate, triethylene glycol diacetate, tetraethylene glycol diacetate, pentaethylene glycol diacetate and hexaethylene glycol diacetate. The preferred poly(ethylene glycol) diacetates for blending with glyceryl triacetate are the di-, tri-, and tetra-, ethylene glycol diacetates.

As will be appreciated by those working in the fibrous cellulose ester matrix field, it was entirely unexpected to find that when a slower bonding plasticizer (glyceryl triacetate) is blended with a faster bonding plasticizer (the glycol diacetates) one would obtain a combination or blend which bonds an acetate matrix even more rapidly than does the faster plasticizer when used alone. One would expect that a retardation of the more rapid bonding action of the faster bonding plasticizer would occur when it is diluted by the addition of the slower bonding plasticizers. It is equally surprising to discover that if more or less than 40 to 60 percent by weight of poly(ethylene glycol) diacetate is blended with the glyceryl triacetate, the hardening time of the blend will be adversely affected. That is, the time required for a fibrous cellulose acetate matrix to harden to an acceptable level will be greatly increased. As will be appreciated, this complete plasticizer reaction time and critical blend range is an unusual phenomenon which could not be predicted by what was previously known in the field.

The reason or theory for this synergistic effect of the combination of the two plasticizers or the critical ranges involved is not clearly understood. However, one explanation could be the face that cellulose ester fibers, such as cellulose acetate, are not highly homogeneous polymers since they have both long and relatively short chain units in their structure as well as having varying degrees of acetyl content within any given segment of a fiber. Therefore, the blend of the two bonding plasticizers might be complementing one another to form a more satisfactory solvent for the polymers than either one of the plasticizers alone, for it is the solvent effect of the plasticizer on the cellulose ester fiber which fuses the fibers into a rigid structure.

These new plasticizer type hardening agents may be applied to the fibrous cellulose ester matrix by any conventional manner. For example, the plasticizer hardening agent can be sprayed on the cellulose ester fibers or batting just prior to the point where the fibers are compacted or otherwise formed into an end product. Another way of adding this high boiling liquid hardening agent to the two is to employ a wicking device which "wipes" the desired amount of liquid on the bloomed-out batting at some point during its travel through the processing equipment. However, regardless of the method or apparatus used in evenly dispersing the plasticizer hardening agent, it has been found that the amount of agent used can vary within a wide range, but if a porous matrix is to be formed then from 4 to 20 percent based on the total weight of the matrix is normally used. Less than about 4 percent of the blend usually results in a matrix which is not as firm as is normally desired in the trade. Increasing the amount of above 20 percent does not usually give an additional advantage unless a solid, nonporous matrix is desired.

A further understanding of the invention will be had from a consideration of the following examples which may be used in actual commercial practice of the invention and which are set forth to illustrate certain preferred embodiments and features thereof.

EXAMPLES

A cellulose acetate web or tow consisting of 15,000 crimped cellulose acetate fibers is spread out or bloomed to form a band of approximately 14 inches in width. The bloomed band of cellulose acetate tow is then treated with the various plasticizers or blend of plasticizers shown under the heading "Plasticizer Formulation" in Table I. This treating of the tow with the plasticizer formulations is accomplished by changing the type of plasticizer in the spray booth at different intervals during the continuous preparation of cellulose acetate two by a technique similar to that described in U.S. Pat. No. 2,794,239. In each case the amount of plasticizer added to the opened tow during its progress through the fibrous matrix forming machine is held within the range of 7.5 and 8.5 percent by weight based on the total weight of the fibrous matrix. Immediately after the plasticizer treatments the rapidly moving tow can be recompacted into a tight bundle and drawn through a device that wraps it in a paper if this is necessary or desirable. Additional processing steps can also be performed on the treated tow or matrix at this point.

After having been treated with the proper amount of plasticizer and formed into the desired shape, the treated tow or matrix is permitted to cure at 75 ±2° F. At predetermined time intervals the treated tow or matrix is tested by subjecting it to a sudden load of 347.5 grams for 10 seconds. A deformation of more than 1.4 mm. is considered soft; 1.1 to 1.4 mm., semifirm; 0.7 to 1.0 mm., firm; and below 0.7 mm., rigid.

TABLE I

| Example | Plasticizer formulation | Hardness rating of the batting | | | |
|---|---|---|---|---|---|
| | | 5 min. | 10 min. | 20 min. | 30 min. |
| 1 | Glyceryl triacetate | Soft | Soft | Soft | Semi-firm. |
| 2 | Diethylene glycol diacetate | do | Semi-firm | Firm | Rigid. |
| 3 | Triethylene glycol diacetate | do | do | do | Do. |
| 4 | Tetraethylene glycol diacetate | do | do | do | Do. |
| 5 | Pentaethylene glycol diacetate | do | do | do | Do. |
| 6 | 70% diethylene glycol diacetate-30% glyceryl triacetate | do | do | do | Do. |
| 7 | 60% diethylene glycol diacetate-40% glyceryl triacetate | do | Firm | Rigid | |
| 8 | 50% diethylene glycol diacetate-50% glyceryl triacetate | do | do | do | |
| 9 | 40% diethylene glycol diacetate-60% glyceryl triacetate | do | do | do | |
| 10 | 30% diethylene glycol diacetate-70% glyceryl triacetate | do | Soft | Soft | Semi-firm. |
| 11 | 70% triethylene glycol diacetate-30% glyceryl triacetate | do | Semi-firm | Firm | Rigid. |
| 12 | 60% triethylene glycol diacetate-40% glyceryl triacetate | do | Firm | Rigid | |
| 13 | 50% triethylene glycol diacetate-50% glyceryl triacetate | do | do | do | |
| 14 | 40% triethylene glycol diacetate-60% glyceryl triacetate | do | do | do | |
| 15 | 30% triethylene glycol diacetate-70% glyceryl triacetate | do | Soft | Soft | Semi-firm. |
| 16 | 70% tetraethylene glycol diacetate-30% glyceryl triacetate | do | Semi-firm | Firm | Rigid. |
| 17 | 60% tetraethylene glycol diacetate-40% glyceryl triacetate | do | Firm | Rigid | |
| 18 | 50% tetraethylene glycol diacetate-50% glyceryl triacetate | do | do | do | |
| 19 | 40% tetraethylene glycol diacetate-60% glyceryl triacetate | do | do | do | |
| 20 | 30% tetraethylene glycol diacetate-70% glyceryl triacetate | do | Soft | Soft | Semi-firm. |
| 21 | 70% pentaethylene glycol diacetate-30% glyceryl triacetate | do | Semi-firm | Firm | Rigid. |
| 22 | 60% pentaethylene glycol diacetate-40% glyceryl triacetate | do | Firm | Rigid | |
| 23 | 50% pentaethylene glycol diacetate-50% glyceryl triacetate | do | do | do | |
| 24 | 40% pentaethylene glycol diacetate-60% glyceryl triacetate | do | do | do | |
| 25 | 30% pentaethylene glycol diacetate-70% glyceryl triacetate | do | Soft | Soft | Semi-firm. |

As will be apparent, these above examples clearly illustrate how certain blends of glyceryl triacetate and a poly(ethylene glycol) diacetate bond a cellulose acetate batting into a rigid structure more rapidly than does either the glyceryl triacetate or poly(ethylene glycol) diacetate alone.

As mentioned briefly hereinabove, several different poly(ethylene glycol) diacetates can be mixed together and the correct percentage of the mixture (i.e., 40 to 60 percent by weight) can then be blended with from 40 to 60 percent by weight of glyceryl triacetate to give the desired plasticizer. For example, the following mixtures of poly(ethylene glycol) diacetates can be prepared:

| Formulation Designation | Plasticizer Formulation |
|---|---|
| A | 10 parts per 100 diethylene glycol diacetate<br>5 parts per 100 triethylene glycol diacetate<br>40 parts per 100 tetraethylene glycol diacetate<br>40 parts per 100 pentaethylene glycol diacetate<br>5 parts per 100 hexaethylene glycol diacetate |
| B | 5 parts per 100 diethylene glycol diacetate<br>10 parts per 100 triethylene glycol diacetate<br>15 parts per 100 tetraethylene glycol diacetate<br>60 parts per 100 pentaethylene glycol diacetate<br>10 parts per 100 hexaethylene glycol diacetate |
| C | 5 parts per 100 diethylene glycol diacetate<br>5 parts per 100 triethylene glycol diacetate<br>30 parts per 100 tetraethylene glycol diacetate<br>30 parts per 100 pentaethylene glycol diacetate<br>30 parts per 100 hexaethylene glycol diacetate |

To produce a batting or nonwoven product using a plurality of poly(ethylene glycol) diacetate blended with from 40 to 60 percent by weight of glyceryl triacetate, a tow or batting material consisting of 15,000 crimped cellulose acetate fibers is spread out or bloomed to form a band of approximately 14 inches in width. The bloomed band of cellulose acetate batting is then treated with the various blend of plasticizers shown under the heading "Plasticizer Formulation" in Table II. This treating of the batting with plasticizer formulations is accomplished by changing the type of plasticizer in the spray booth at different intervals during the continuous preparation of cel-

TABLE II

| | | Hardness rating of the batting | | | |
|---|---|---|---|---|---|
| Ex. | Plasticizer formulation | 5 min. | 10 min. | 20 min. | 30 min. |
| 26 | 70% formulation A-30% glyceryl triacetate | Soft | Semi-firm | Firm | Rigid. |
| 27 | 60% formulation A-40% glyceryl triacetate | do | Firm | Rigid | |
| 28 | 50% formulation A-50% glyceryl triacetate | do | do | do | |
| 29 | 40% formulation A-60% glyceryl triacetate | do | do | do | |
| 30 | 30% formulation A-70% glyceryl triacetate | do | Semi-firm | Firm | Do. |
| 31 | 70% formulation B-30% glyceryl triacetate | do | do | do | Do. |
| 32 | 60% formulation B-40% glyceryl triacetate | do | Firm | Rigid | |
| 33 | 50% formulation B-50% glyceryl triacetate | do | do | do | |
| 34 | 40% formulation B-60% glyceryl triacetate | do | do | do | |
| 35 | 30% formulation B-70% glyceryl triacetate | do | Semi-firm | Firm | Do. |
| 36 | 70% formulation C-30% glyceryl triacetate | do | do | do | Do. |
| 37 | 60% formulation C-40% glyceryl triacetate | do | Firm | Rigid | |
| 38 | 50% formulation C-50% glyceryl triacetate | do | do | do | |
| 39 | 40% formulation C-60% glyceryl triacetate | do | do | do | |
| 40 | 30% formulation C-70% glyceryl triacetate | do | Semi-firm | Firm | Do. | lulose acetate filter rods by a technique similar to that described in U.S. Pat. No. 2,794,239. In each case the amount of plasticizer added to the opened tow during its progress through the filter plug making machine is held within the range of 7.5 and 8.5 percent by weight based on the total weight of the batting product. Immediately after these plasticizer treatments the rapidly moving batting is recompacted into a bundle which can then be drawn through a device that wraps it in a suitable material (paper) if such is necessary or desirable. The formed batting is now stored at 75 ±2° F. to cure and are tested at predetermined time intervals to determine rod hardness.

From the several examples given in Table II it can be seen that mixtures of several poly(ethylene glycol) diacetates can be blended with from 40 to 60 percent by weight of glyceryl triacetate to give a plasticizer blend having unique properties. As will be appreciated, this is an important consideration since it is often necessary or desirable to use such poly(ethylene glycol) diacetates mixtures rather than attempting to obtain a pure material having only one poly(ethylene glycol) diacetate therein.

To determine the hydrolysis of various plasticizers or plasticizer blends shown under the heading "Plasticizer Formulations" in Table III, these bends are placed in open petri dishes and the dishes stored for 60 days in a chamber maintained at a temperature of 80° F. and a relative humidity of 75 percent. The amount of water and acetic acid that will be found in the various samples at the end of the 60 day period is listed in Table III.

From the examples of Table III it is apparent that the addition of glyceryl triacetate to a poly(ethylene glycol) diacetate

TABLE III

| | | Percent water | | Percent acetic acid | |
|---|---|---|---|---|---|
| Ex. | Plasticizer formulation | At start | 60 days | At start | 60 days |
| 41 | Glyceryl triacetate | 0.02 | 0.5 | 0.002 | 0.10 |
| 42 | Diethylene glycol diacetate | 0.02 | 3.0 | 0.02 | 1.00 |
| 43 | 50 parts glyceryl triacetate and 50 parts diethylene glycol diacetate. | 0.02 | 1.0 | 0.01 | 0.40 |
| 44 | Triethylene glycol diacetate | 0.02 | 2.2 | 0.01 | 0.80 |
| 45 | 50 parts glyceryl triacetate and 50 parts triethylene glycol diacetate. | 0.02 | 0.8 | 0.005 | 0.30 |
| 46 | Tetraethylene glycol diacetate | 0.02 | 1.0 | 0.01 | 0.50 |
| 47 | 50 parts glyceryl triacetate and 50 parts tetraethylene glycol diacetate. | 0.02 | 0.6 | 0.005 | 0.15 | greatly reduces its capacity for absorbing water and liberating acetic acid when stored under humid atmospheric conditions. As will be appreciated, this reduction in the hydrolysis of the blend is of utmost importance in the production of batting or nonwoven products which will come into contact with the human body.

From the foregoing it will be obvious that the use of these new cellulose ester hardening agents offer numerous advantages over any other such agents heretofore used in the industry. For example, they cure or harden an acetate batting material at room temperature more rapidly than any other plasticizer of the nontacky, high-boiling liquid type. The fact that they are odorless, tasteless, and adapted for use in existing commercial equipment is of prime importance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A bonding plasticizer blend comprising from about 40 to 60 percent by weight glyceryl triacetate and from about 60 to 40 percent by weight of at least one poly(ethylene glycol) diacetate having a structural formula $$RO(CH_2CH_2O)_n-R$$

wherein

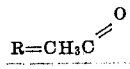

and $n=2$ to 6.

2. Bonding plasticizer blend according to claim 1 wherein the poly(ethylene glycol) diacetate is selected from the group consisting of diethylene glycol diacetate, triethylene glycol diacetate, and tetraethylene glycol diacetate.

3. Bonding plasticizer blend according to claim 1 wherein about 40 to 50 percent by weight of glyceryl triacetate is blended with about 60 to 50 percent by weight of poly(ethylene glycol) diacetate.

4. Bonding plasticizer blend according to claim 3 wherein the poly(ethylene glycol) diacetate is selected from the group consisting of diethylene glycol diacetate, triethylene glycol diacetate and tetraethylene glycol diacetate.

5. Bonding plasticizer blend according to claim 1 wherein about 50 percent by weight of glyceryl triacetate is blended with about 50 percent by weight of poly(ethylene glycol) diacetate.

6. Bonding plasticizer blend according to claim 5 wherein the poly(ethylene glycol) diacetate is selected from the group consisting of diethylene glycol diacetate, triethylene glycol diacetate, and tetraethylene glycol diacetate.

* * * * *